United States Patent [19]

Levins et al.

[11] Patent Number: 5,661,630

[45] Date of Patent: Aug. 26, 1997

[54] PRECISION-ALIGNED MONITOR-FRAME UNIT IN COMBINATION WITH CHASSIS AND HOUSING AND METHOD OF ASSEMBLING FRAME

[75] Inventors: James K. Levins, Santa Clara; Steven B. Chase, Cupertino; Christopher J. Novak, Santa Clara; Michael T. Milo, San Jose, all of Calif.

[73] Assignee: Apple Computer, Inc., Cupertino, Calif.

[21] Appl. No.: 415,465

[22] Filed: Apr. 3, 1995

[51] Int. Cl.⁶ .................................................. H05K 5/00
[52] U.S. Cl. ............................................. 361/683; 312/7.2
[58] Field of Search ................................... 361/679–683; 312/7.2, 223.2, 223.3, 351.2; 358/248, 254

[56] References Cited

U.S. PATENT DOCUMENTS

| | | | |
|---|---|---|---|
| 4,644,408 | 2/1987 | Coleman | 384/836 |
| 4,651,218 | 3/1987 | Fazioli | 358/248 |
| 5,084,757 | 1/1992 | Leo et al. | 358/248 |

*Primary Examiner*—Leo P. Picard
*Assistant Examiner*—Jayprakash N. Gandhi
*Attorney, Agent, or Firm*—Burns, Doane, Swecker & Mathis, L.L.P.

[57] ABSTRACT

An appliance such as a personal computer includes a chassis, a monitor mounted to the chassis, and an outer housing encompassing the chassis. The chassis comprises a base portion, and a frame portion removably mounted to the base portion. The monitor is mounted to the frame portion in precise locational relationship thereto to form a frame/monitor unit that can be dismounted or mounted relative to a chassis base portion. The base and frame portions include mutually engageable positioning projections for precisely locating the frame portion with respect to the base portion.

14 Claims, 4 Drawing Sheets

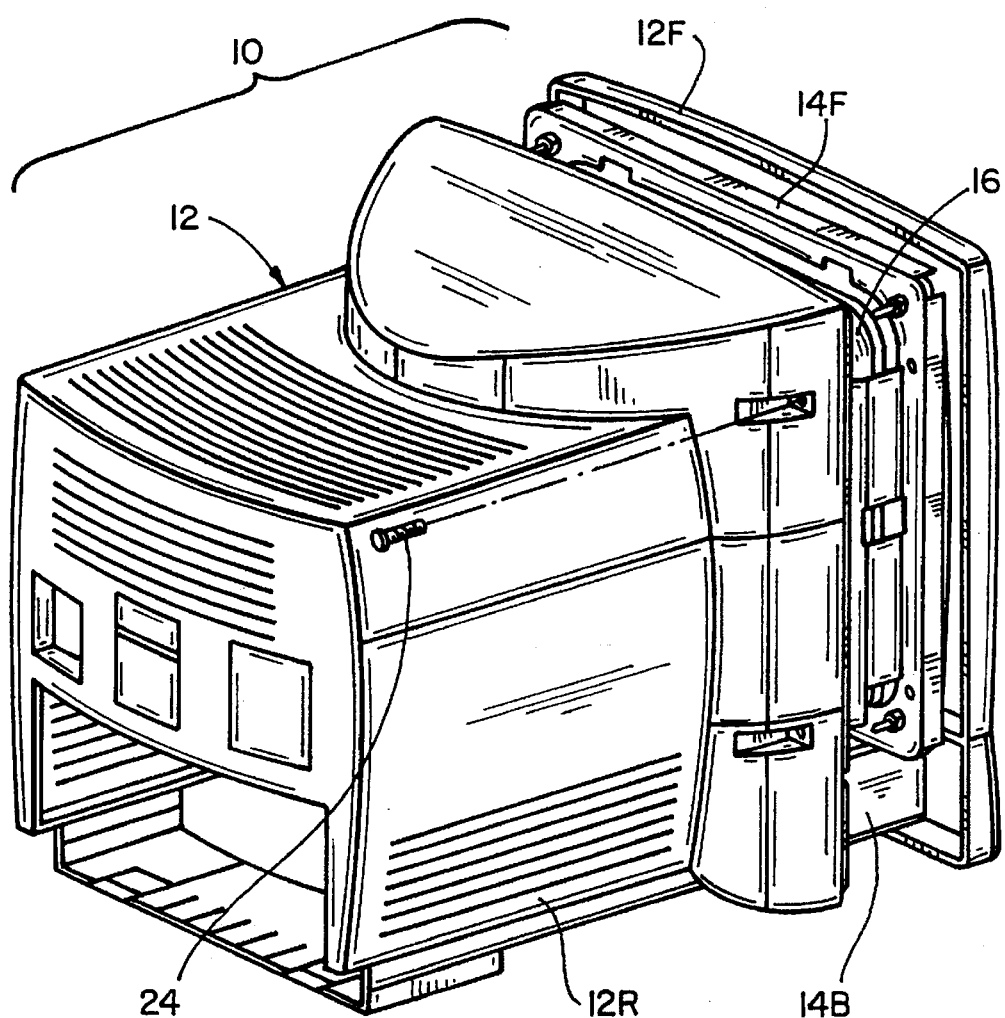
FIG_1
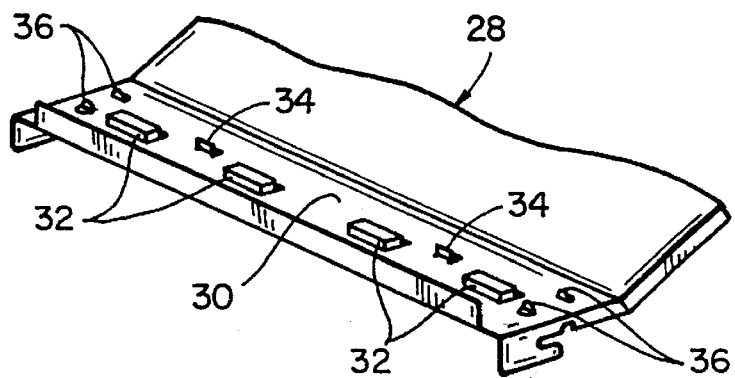
FIG_2

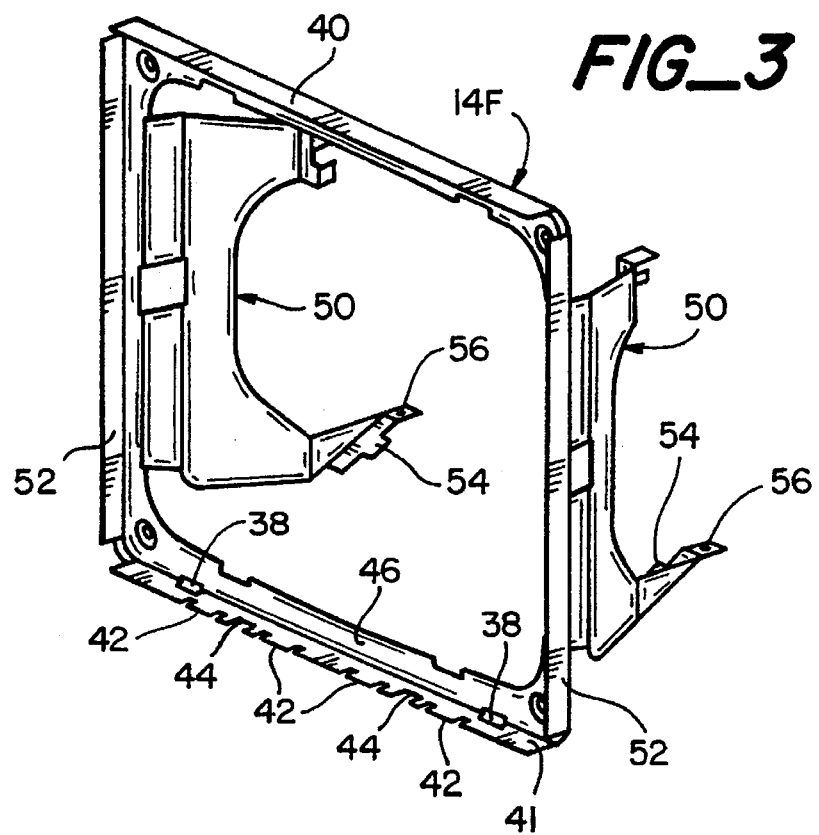
FIG_3
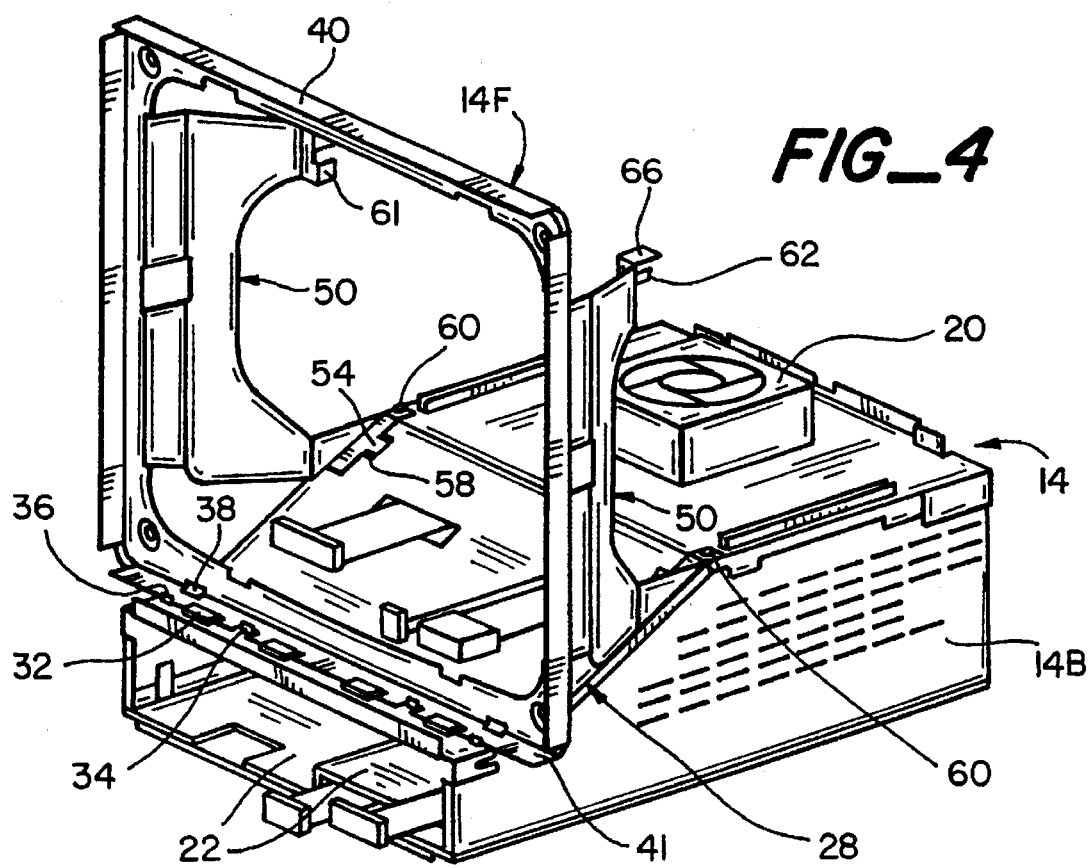
FIG_4

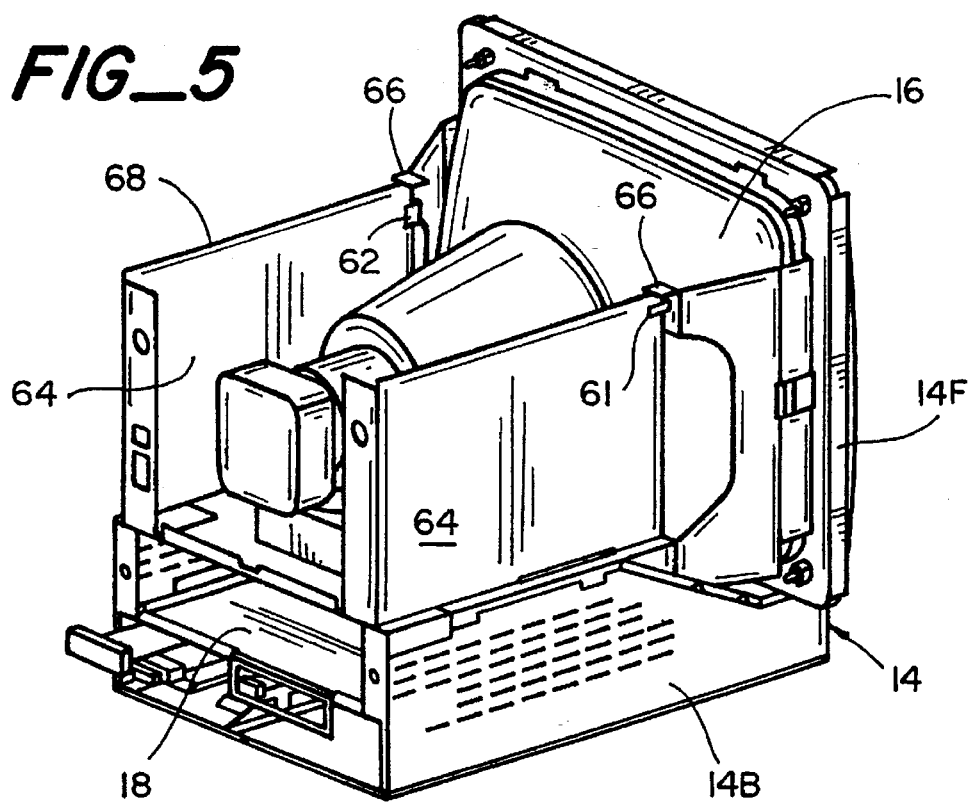
FIG_5
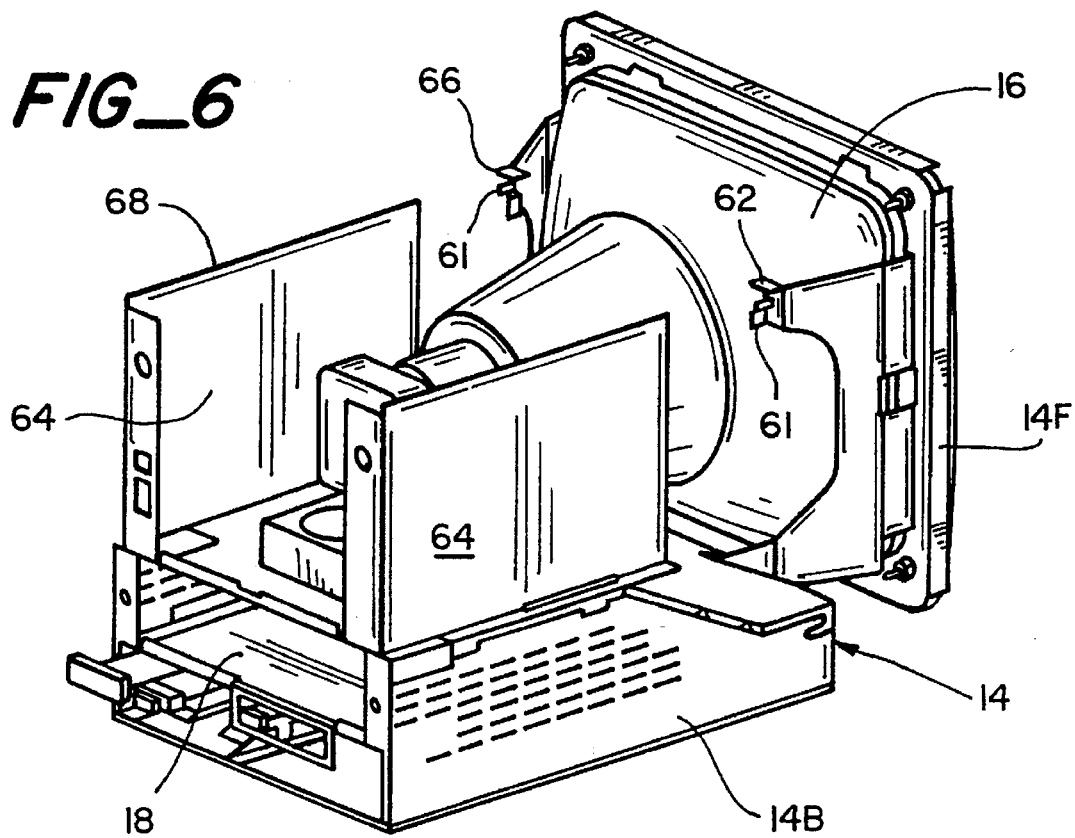
FIG_6

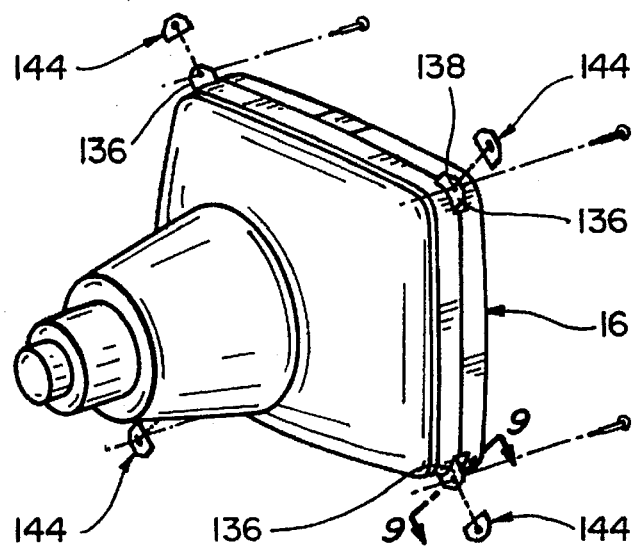
FIG_7
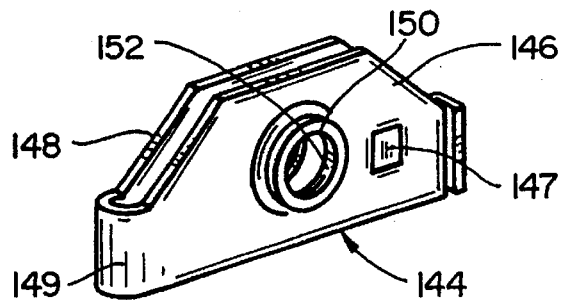
FIG_8
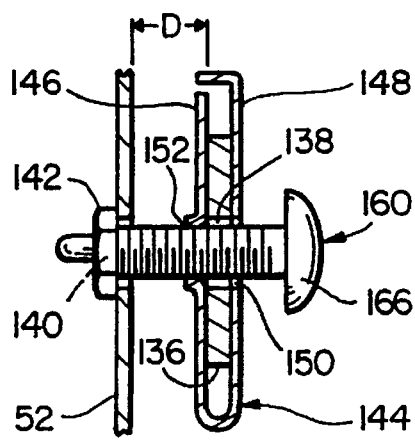
FIG_9
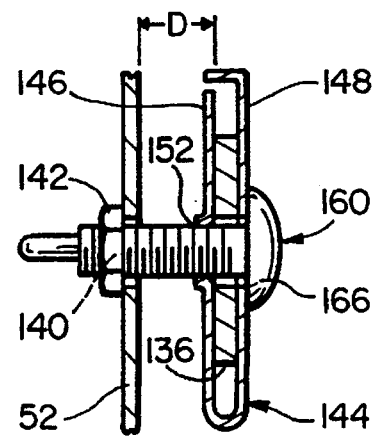
FIG_10

PRECISION-ALIGNED MONITOR-FRAME UNIT IN COMBINATION WITH CHASSIS AND HOUSING AND METHOD OF ASSEMBLING FRAME

RELATED INVENTION

This invention is related to the invention disclosed in concurrently filed application Ser. No. 08/415,469 entitled "Monitor-Chassis Combination Disposed In a Housing and Method and Apparatus for Manufacturing Same", the disclosure of which is incorporated herein by reference.

BACKGROUND OF THE INVENTION

The present invention relates to appliances of the type having a monitor mounted to a chassis and disposed in a housing, such as for example, televisions and computers, including all-in-one computers and computers having separate monitors. An appliance such as a personal computer typically includes a monitor or CRT mounted in a metal chassis that is, in turn, encased within an outer housing formed, for example, of plastic. The operating equipment for the monitor (e.g., power source, mother board, disc drive, etc.) can be carried by a separate chassis; or in the case of an all-in-one type of personal computer, the monitor and associated operating equipment can share a common chassis. A monitor-carrying chassis typically comprises a base portion, and a rectangular frame oriented vertically at the front of the base portion for receiving the screen of the monitor.

The housing may comprise interconnected front and rear sections, the front section being in the form of a rectangular bezel which surrounds (frames) the outer periphery of the monitor screen. The front and rear housing sections are joined together by means of screws which pull adjoining edges of those housing sections together.

The location of the bezel relative to the monitor is important in order to ensure that the bezel properly frames the monitor. That is, if the bezel were spaced forwardly from the monitor screen, an excessive and unsightly gap could be formed between the bezel and screen presenting the risk of foreign objects becoming lodged therein. Thus, the bezel should abut the front of the monitor. Also, the junction or reveal between the bezel and rear housing section should be straight (i.e., non-wavy) and flush.

Additionally, the location of the bezel should be accurate with respect to any control switches mounted on the chassis. In that regard, certain control switches may be mounted to the chassis, with access to those switches afforded through the front housing. For some controls, a pass-through connection is sufficient, e.g., a shaft for a knob, but for one preferred type of actuating mechanism wherein a switch includes an actuator that must be moved along a certain axis, e.g., by being pressed, a movable component such as a button carried by the bezel should just contact or perhaps should not quite contact a corresponding actuator of a switch fixed to the chassis when in a resting position, yet be able to be brought into contact with and press the corresponding actuator with only a small total travel distance of the button. The switch actuators typically have a throw of about 0.5 mm, so the positioning of a button in a housing over a control switch should preferably be accurate to a tolerance of about ±1.0 mm.

To reiterate, the front housing (bezel) must conform closely to the surface of the monitor screen and also must meet the rear housing accurately. The rear housing must meet the chassis and the front housing accurately.

However, in the prior art, the fit between chassis and monitor, in particular, the position of the monitor screen relative to the chassis, has not been controlled with sufficient precision, which in turn has meant that tolerances between front and rear housing, chassis and monitor could not be held to small dimensions.

In that regard, it has been conventional to assemble a personal computer by attaching the bezel to the monitor, then mounting the chassis and the rear housing section to the bezel. The mounting of the bezel to the monitor involves the use of screws extending between bosses on the bezel, and flanges on the monitor for drawing the bezel and monitor together. However, the manufacturing accuracy of the flanges relative to the rest of the monitor, e.g., relative to the monitor screen, is about ±2.0 mm, which means that as the screws are tightened to draw the bosses and flanges together, any inaccuracies between the flange locations will cause the bezel to become warped, making for an unsightly reveal between the bezel and rear housing section.

Moreover, the manufacturing accuracy of ±2.0 mm for the monitor flanges exceeds the above-mentioned tolerance of ±1.0 mm required to ensure proper operation of control switches mounted on the chassis. Therefore, difficulties may be encountered in ensuring proper operation of those switches.

Furthermore, after the bezel is mounted to the monitor, that bezel/monitor unit must be further handled as a unit in order to be mounted in the chassis, whereupon the bezel can become scratched or otherwise damaged.

In the above-mentioned concurrently filed application Ser. No. 08/415,469 there are disclosed methods and apparatus for assembling the chassis, monitor, and housing components of a personal computer in a manner which enables the adjoining edges of the front (bezel) and rear housing sections to be joined together in flush engagement (no warping), and which enables push buttons on the bezel to be properly positioned with respect to switches on the chassis. Also, handling and damaging (e.g., scratching) of the bezel is minimized. Those methods and apparatus involve the use of a fixture against which the monitor and chassis are positioned to establish a predetermined positional relationship between the monitor and chassis. Then, the monitor and chassis are interconnected through the use of novel brackets which are screwed to the monitor flanges to fix that predetermined positional relationship. By using the fixture and brackets to establish the positional relationship between the monitor housing, any positional inaccuracies between the flanges of the monitors will not affect the positioning of the monitor relative to the chassis or other housing.

After the computer has been in use, however, it may become necessary for the monitor to be removed from the chassis for repair or replacement. When the repaired monitor or new monitor is then installed into the chassis, the special alignment fixture may not be available, whereupon the original precision positioning of the monitor may be lost, thereby resulting in the aforementioned problems.

It would be desirable, therefore, to enable a repaired or replacement monitor to be installed in a chassis easily, rapidly and with a relatively high degree of precision, without the need for special alignment fixtures.

SUMMARY OF THE INVENTION

One aspect of the present invention relates to a chassis for a personal computer, which chassis comprises a base portion and a frame portion removably mounted on the base portion. The frame portion is configured to receive and position a screen of a monitor. The base and the frame portions include mutually engageable positioning elements for locating the frame portion relative to the base portion and opposing relative movement between the base portion and frame portion.

The positioning elements preferably comprise mutually engageable projections on the base and frame portions respectively.

The base portion preferably includes an upwardly facing front surface, and the frame portion includes a bottom portion mountable on the front surface. The front surface includes some of the projections, and the bottom portion includes others of the projections which are engageable with the projections of the front surface.

Another aspect of the present invention relates to the combination of the above described chassis in combination with a monitor.

Yet another aspect of the invention relates to a method of assembling an appliance, comprising the steps of mounting a component (e.g., a monitor, control button, etc.) on a first chassis portion in a predetermined positioned relationship therewith, and mounting the first chassis portion onto a second chassis portion in a predetermined positional relationship therewith, whereby the component is in a predetermined positional relationship with the second chassis position.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 1 is a rear perspective exploded view of a personal computer according to the present invention;

FIG. 2 is a perspective fragmentary view of a part of a chassis of the personal computer depicted in FIG. 1;

FIG. 3 is a perspective view of a frame portion of the chassis;

FIG. 4 is a perspective view of the frame portion of the chassis mounted to a base portion of the chassis;

FIG. 5 is a rear perspective view of the chassis, with a monitor mounted thereon;

FIG. 6 is a view similar to FIG. 5 with a monitor/frame unit detached from a base portion of the chassis;

FIG. 7 is a perspective view of a monitor showing the placement of mounting brackets thereon;

FIG. 8 is a perspective view of a mounting bracket;

FIG. 9 is a sectional view taken along the line 9—9 in FIG. 7 as the monitor is being mounted in a chassis; and FIG. 10 is a view similar to FIG. 9 after the mounting has been completed.

DETAILED DESCRIPTION OF A PREFERRED EMBODIMENT OF THE INVENTION

The present invention is applicable to appliances containing a monitor, such as a television and a computer (e.g., all-in-one computer or a computer having a separate monitor).

For example, a personal computer 10 depicted in FIG. 1 comprises an outer housing 12 and a metal chassis 14 mounted within the outer housing, the chassis 14 carrying a monitor 16. The computer is of the "all-in-one type", wherein the operating equipment for the monitor, e.g., mother board 18 (FIG. 6), cooling fan 20 (FIG. 4), disc drives (not shown) mountable in bays 22 (FIG. 4), etc. are also disposed in the chassis 14.

The outer housing 12 includes front and rear sections 12F, 12R which can be formed of plastic and joined together by fasteners, e.g. screws 24 (FIG. 1). As explained earlier herein, the screen of the monitor must be properly located with respect to the chassis in order to enable the housing sections to be properly joined without creating a gap between the monitor screen and the front housing section, and in order to ensure that push buttons on the bezel are properly located with respect to switches on the chassis. Therefore, the monitor 16 is mounted in a front portion of the chassis with a high degree of accuracy which permits the outer housing sections 12F, 12R to be properly positioned relative to each other and relative to the monitor and chassis. The technique for achieving that accurate positioning of the monitor relative to the chassis is described in concurrently filed application Ser. No. 08/415,469 and will be summarized later herein.

As pointed out earlier, it may at some time become necessary for the monitor to be removed from the chassis for repair or replacement. When the repaired or new monitor is then installed in the chassis, the special alignment fixture may not be available, whereupon the original precision positioning of the monitor may be lost.

Accordingly, the chassis 14 is formed of multiple portions, such that a removable portion carries the monitor and can be easily replaced in a precise location. With attention directed to FIGS. 3–6, it can be seen that the chassis 14 comprises a base portion 14B and a frame portion 14F removably mounted on front of the base portion 14B. The base portion 14B carries the operating equipment for the monitor, including the memory board 18, and cooling fan 20, as well as power supply, speaker, microphone, etc. which are not shown.

The base portion 14B is formed of a plurality of parts, including a part 28 presenting a flat upwardly facing surface 30 disposed at the front of the base portion 14B. That surface 30 has been cut and bent to form a series of locating projections, including first projections 32 that define horizontal, rearwardly open first slots, i.e. slots which open to the right in FIGS. 2 and 4. Those first projections 32, which are closed at their tops, are arranged in a line extending laterally, i.e., perpendicular to a front-to-rear direction of the computer.

Also formed in the surface 30 are second locating projections 34 disposed between adjacent ones of the first projections. Situated near each end of the surface 30 is a pair of third locating projections 36 that are spaced apart in the front-to-rear direction.

The frame portion 14F includes an upright rectangular section 40 in which the screen of the monitor is received and mounted. The manner of mounting the monitor to the frame portion 14F, which will be described later herein is also described in detail in the afore-mentioned application Ser. No. 08/415,469.

The rectangular frame section 40 includes a bottom portion in the form of a horizontal plate 41 (see FIG. 3) which includes fourth locating projections 42 extending forwardly in coplanar relationship to the plate 41. Those fourth projections 42 are sized to be received in the slots formed by the first projections 32 of the base portion 14B. The plate 41 also includes coplanar second slots 44 which are open in a horizontally forward direction and sized to receive the second projections 34 with a relatively snug fit.

The rectangular section includes holes 38 formed at the intersection between the plate 41 and a vertical flange 46 of the rectangular section. Those holes are adapted to receive a rear one of the third projections 36 of each pair thereof, whereby the plate 41 can be held between each pair of third projections 36, as shown in FIG. 4.

The frame portion 14F includes a pair of side walls 50 projecting rearwardly from upright portions 52 of the rectangular section 40. Each side wall 50 includes at its lower rear end an inwardly projecting tab 54 and a hole 56. The tabs 54 are adapted to be inserted into slots 58 formed by bent portions of the part 28 of the base portion 14B (only one slot 58 shown in the drawing). Screws 60 can be inserted through the holes 56 and threadedly connected to the part 28.

At an upper rear end of each side wall 50 there is provided a pair of horizontally spaced, rearwardly extending flanges 61, 62 (see FIG. 6) arranged to form a gap therebetween for receiving a front end of a vertical side part 64 of the base portion 14B. Also, each side wall 50 includes a top flange 66 for engaging a top edge 68 of a respective side part 64.

When assembling the computer, the monitor 16 is attached to the rectangular section 40 of the frame portion 14F of the chassis 14 with a high degree of precision in a manner to be described later herein, whereby the monitor screen is located in a desired relationship to the rectangular section 40. This can be done either before or after the section 40 of the frame portion 14F is attached to the base portion 14B of the chassis. That latter attachment is made by inserting the projections 42 of the frame portion into the slots defined by the projections 32 of the base portion, and then pivoting the plate 41 downwardly so that the projections 34 enter the slots 44, and also so that the plate 41 becomes positioned between each pair of projections 36.

In that state, the rectangular section 40 is prevented from moving in a front-to-rear direction by projections 36, in a lateral direction by the projections 34, and in an upward direction by the first projections 32.

The rear of the frame portion 14F is anchored to the base portion 14B by inserting the tabs 54 into the slots 58, and by installing the screws 60.

It will be appreciated that since (i) the monitor screen had previously been located with precision relative to the frame portion 14F, and (ii) the frame portion 14F is now precisely located with respect to the base portion 14B (due to the engagement between the projections 32, 34, 36, and 42, and slots 44), it is ensured that the outer housing sections 12F, 12R can be secured to one another in such manner that their adjoining edges make proper contact with one another, without an unsightly gap is created between the monitor screen and the front housing portion 14F.

After the computer has been in use and it becomes necessary to replace a faulty monitor 16, this can be done easily and with precision by removing the front housing section 12F and then removing the frame portion 14F (along with the attached monitor 16) from the base portion 14B. Then a replacement unit 14F, 16 in which the monitor has been previously factory-mounted with precision can be installed on the chassis base 14B.

It will be understood that in accordance with the present invention, a monitor can be quickly and easily installed with precision upon a chassis base without the need for a special fixture.

The preferred manner of mounting the monitor with locational precision within the frame portion 14F (disclosed in detail in the afore-mentioned application Ser. No. 08/415,469, involves providing the monitor with a plurality of outwardly projecting flanges 136 at four respective corners of the screen portion thereof as shown in FIG. 7. Each flange 136 is provided with a through-hole 138 that can be aligned with a respective screw-threaded through-hole 140 formed by a nut 142 fixed to the upright section 52 of the chassis frame portion 14F.

Associated with for each flange 136 is a metallic spacer bracket 144 which is of generally U-shape and includes a pair of legs 146, 148 interconnected by a bight 149. Each of the legs 146, 148 includes a spring arm 147 which is partially cut-out and bent inwardly toward the opposite leg. One of the legs includes a through-hole 150, and the other leg 146 includes a screw-threaded through-hole 152 aligned with the through-hole 150. The bracket 144 can be placed on a respective flange 136 such that when the monitor is mounted in the frame portion 14F, the through-holes 138, 140, 150, 152 are coaxially oriented to receive mounting screws 160. Before the screws 160 are installed, it is necessary to space the flanges 136 forwardly from the frame portion 28 by a predetermined distance D (see FIG. 9) for ensuring that the front face of the monitor screen is situated at a proper location relative to the chassis in order to permit the frame sections 12F, 12R to be correctly attached together, i.e., to enable the adjoining edges of the frame sections to be brought into flush engagement without any warping of the bezel 14F, and without an excessive gap being formed between the bezel and the monitor screen. To achieve such a positioning of the monitor flanges 136 relative to the frame section 14F, the frame portion 14F and monitor 16 are brought into engagement with respective stop surfaces of a stationary fixture.

The brackets 144 are positioned on their respective flanges 136 such that the leg 146 faces the upright section 52, and both legs 146, 148 engage respective sides of the flange 136. Then, the screw 160 is inserted through each set of aligned through-holes 138, 140, 150 and 152. The thread of the bolt 160 is sized to mate with the threaded through-holes 140 and 152. As soon as the thread mates with both through-holes 140, 152, the spacing between the upright portion 52 and the leg 146 of the bracket becomes locked, since the screw thread prevents any relative axial movement from occurring between those elements 52, 146.

Since the screen of the monitor is at a fixed distance from each flange 136, the step of fixing the distance between each flange 136 and each through-hole 140, serves to ensure that the position of the monitor screen relative to the chassis portion 14F is also fixed with great precision.

FIG. 9 depicts the screw 160 after it has been screwed through the through-hole 152 and has just reached the through-hole 140. FIG. 10 depicts the screw 160 after it has been further screwed through the through-hole 140, and a head 166 of the bolt has pressed the leg 148 of the bracket 144 into contact with the flange 136, whereby the flange becomes tightly sandwiched between the legs 146, 148. Since the relative positions of the leg 146 and the upright portion 52 are locked, the relative positions between the flange 136 and the upright portion 52 will also be locked.

The present invention enables a monitor to be removed from an appliance and then replaced, without adversely affecting a precision alignment of that monitor which was initially established with respect to the chassis.

Although the present invention has been described in connections with a preferred embodiment thereof, it will be appreciated by those skilled in the art that additions, deletions, modifications, and substitutions not specifically described may be made without departing from the spirit and scope of the invention as defined in the appended claims.

What is claimed:

1. In an appliance including a chassis, a monitor mounted on said chassis, and an outer housing removably mounted on said chassis, the improvement wherein said chassis comprises:

a base portion;

a frame portion removably mounted on said base portion and carrying said monitor in predetermined spaced apart relationship with said frame portion;

said base and frame portions including mutually engageable positioning elements for locating said frame portion relative to said base portion and opposing relative movement between said base portion and said frame portion; and an outer housing encompassing said base portion, said frame portion and said monitor, said outer housing including front and rear sections;

a first set of fasteners securing said front section to said rear section; and a second set of fasteners securing said monitor to said frame portion to enable said monitor and frame portion to be inserted onto, and removed from, said base portion as an interconnected unit, independently of said front and rear sections.

2. In an appliance including a chassis, a monitor mounted on said chassis, and an outer housing removably mounted on said chassis, the improvement wherein said chassis comprises:

a base portion; and a frame portion removably mounted on said base portion and carrying said monitor in predetermined spaced apart relationship with said frame portion;

said base and frame portions including mutually engageable positioning elements for locating said frame portion relative to said base portion and opposing relative movement between said base portion and said frame portion;

said base portion having forward and rearward ends; said frame portion being removably mounted on said forward end of said base portion and including a recess open in a forward direction for receiving said monitor; said frame portion carrying said monitor in said predetermined spaced apart relationship; said chassis further comprising a housing mounted on said base and frame portions and including a portion disposed in front of an outer peripheral edge of said recess.

3. The appliance according to claim 2, further including a plurality of externally screw-threaded fasteners, each fastener being connected to an internal screw thread on said first chassis portion and to an internal screw thread on said component, to position said component and first chassis portion in said predetermined spaced apart relationship.

4. In an appliance including a chassis, a monitor mounted on said chassis, and an outer housing removably mounted on said chassis, the improvement wherein said chassis comprises:

a base portion; and a frame portion removably mounted on said base portion and carrying said monitor in predetermined positional relationship therewith;

said base and frame portions including mutually engageable positioning elements for locating said frame portion relative to said base portion and opposing relative movement between said base portion and said frame portion;

said monitor including flanges disposed between said frame portion and said housing, each flange including a through-hole aligned with a threaded hole in said frame portion; a bracket mounted on said flange and including a through-hole aligned with said through-holes in said flange and frame portion, said through-hole of at least one of said legs being screw-threaded; and a bolt threadedly mounted in said threaded through-hole of said frame portion and in said threaded through-hole of said one leg, said flange being tightly held between said legs.

5. In an appliance including a chassis, a monitor mounted on said chassis, and an outer housing removably mounted on said chassis, said monitor carrying flanges, the improvement wherein said chassis comprises:

a base portion; and a frame portion removably mounted on said base portion and attached to said flanges of said monitor such that said frame portion is disposed in predetermined spaced apart relationship to both said monitor and said flanges;

said base and frame portions including mutually engageable positioning elements for locating said frame portion relative to said base portion and opposing relative movement between said base portion and said frame portion.

6. The appliance according to claim 5, wherein said appliance comprises a personal computer, and further including a memory board, bays for receiving disc drives, and a cooling unit, all mounted in said chassis.

7. The appliance according to claim 5, wherein said positioning elements comprise mutually engageable projections on said base and frame portions, respectively.

8. The appliance according to claim 5 further including a plurality of screw-threaded fasteners, each fastener being connected to a screw thread carried by said frame portion and to a second screw thread carried by said monitor, to position said monitor and frame portion in said predetermined spaced apart relationship.

9. An appliance comprising:

a first chassis portion;

a component carried by said first chassis portion in a predetermined spaced apart relationship therewith which is accurate to a tolerance in the range of +0.1 to 0.2 mm; and a second chassis portion;

said first chassis portion mounted on said second chassis portion in a predetermined positional relationship therewith, whereby said component is in a predetermined positional relationship with respect to said second chassis portion.

10. The appliance according to claim 9, wherein the positional relationship of said component to said first chassis portion is accurate to a substantially zero tolerance.

11. The appliance according to claim 9 further including a front outer housing section secured to one of said first and second chassis sections.

12. The appliance according to claim 9, further including front and rear outer housing sections, each secured to one of said first and second chassis portions.

13. The appliance according to claim 9, wherein said appliance is a personal computer.

14. The appliance according to claim 9, wherein said component is a monitor.

* * * * *